United States Patent
Ferlitsch et al.

(10) Patent No.: US 8,122,372 B2
(45) Date of Patent: Feb. 21, 2012

(54) METHOD AND SYSTEM FOR RENDERING WEB PAGES ON A WIRELESS HANDSET

(75) Inventors: Andrew R. Ferlitsch, Camas, WA (US); Benjamin K. Gibbs, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 976 days.

(21) Appl. No.: 12/148,195

(22) Filed: Apr. 17, 2008

(65) Prior Publication Data

US 2009/0262142 A1   Oct. 22, 2009

(51) Int. Cl.
  *G06F 3/048* (2006.01)
(52) U.S. Cl. .......................... 715/782; 715/802
(58) Field of Classification Search .............. 345/419, 345/619, 649, 653, 654
  See application file for complete search history.

(56) References Cited

U.S. PATENT DOCUMENTS

| | | | | |
|---|---|---|---|---|
| 6,023,714 | A | 2/2000 | Hill et al. | 715/235 |
| 6,300,947 | B1 | 10/2001 | Kanevsky | 715/886 |
| 6,389,437 | B2 | 5/2002 | Stoub | 715/201 |
| 6,456,305 | B1 | 9/2002 | Qureshi et al. | 715/800 |
| 6,466,203 | B2 | 10/2002 | Van Ee | 345/173 |
| 6,556,217 | B1 | 4/2003 | Makipaa et al. | 345/667 |
| 6,593,944 | B1 | 7/2003 | Nicolas et al. | 715/744 |
| 6,832,353 | B2 | 12/2004 | Itavaara et al. | 715/744 |
| 6,955,298 | B2 | 10/2005 | Herle | 235/472.01 |
| 6,976,226 | B1 | 12/2005 | Strong et al. | 715/788 |
| 6,983,331 | B1 | 1/2006 | Mitchell et al. | 709/246 |
| 7,120,870 | B1 | 10/2006 | Nakamura | 715/236 |
| 7,143,347 | B2 | 11/2006 | Su | 715/208 |
| 7,216,177 | B1 | 5/2007 | Strong et al. | 709/230 |
| 7,219,309 | B2 | 5/2007 | Kaasila et al. | 715/800 |
| 7,302,637 | B1 | 11/2007 | Maguire | 715/210 |
| 7,797,641 | B2 * | 9/2010 | Karukka et al. | 715/802 |
| 2006/0107229 | A1 * | 5/2006 | Matthews et al. | 715/782 |
| 2006/0161861 | A1 * | 7/2006 | Holecek et al. | 715/782 |
| 2006/0288280 | A1 * | 12/2006 | Makela | 715/530 |
| 2007/0152984 | A1 | 7/2007 | Ording et al. | 345/173 |

FOREIGN PATENT DOCUMENTS

EP   0670652 B1   8/2000

OTHER PUBLICATIONS

Opera Mini, Opera Mini Features, <http://www.operamini.com/features>, 6 pages.
Wikipedia, Opera Mini, <http://en.wikipedia.org/wiki/Opera_Mini>, 12 pages.
Microsoft Corp., Deepfish FAQ, < http://www.labs.live.com/Deepfish/faq.aspx >, 4 pages.
Skyfire Labs, Inc., What is Skyfire?, < http://www.skyfire.com/product >, 4 pages.

* cited by examiner

*Primary Examiner* — Daniel Washburn
*Assistant Examiner* — Donna Ricks
(74) *Attorney, Agent, or Firm* — Scot A. Reader (57) ABSTRACT

A wireless handset and a method and system for a wireless handset that better enable a user of the wireless handset to identify, select and view objects on a web page. Objects from a web page are rendered on a wireless handset display as selectable panels in perspective views. The rendering of objects from a web page as selectable panels in perspective views allows a web page designed for rendering on a display of a conventional Internet capable device to fit within a much smaller display of a wireless handset while maintaining the relative position, visibility, selectability and natural appearance of the objects.

18 Claims, 7 Drawing Sheets

METHOD AND SYSTEM FOR RENDERING WEB PAGES ON A WIRELESS HANDSET

BACKGROUND OF THE INVENTION

The present invention relates to rendering web pages and, more particularly, to a wireless handset and a method and system for a wireless handset that better enable a user of the wireless handset to identify, select and view objects on a web page.

Many wireless handsets, such as mobile phones, personal data assistants (PDAs) and global positioning system (GPS) navigation devices, are Internet capable. However, most web pages are designed for rendering on more conventional Internet capable devices, such as personal computers or workstations. Since the displays on Internet capable wireless handsets are generally much smaller than the displays on more conventional Internet capable devices, web pages downloaded to Internet capable wireless handsets must be rendered in a manner that preserves the ability of the user to identify, select and view objects on the web page.

Some wireless handsets render web pages in a pan-and-view format. In these handsets, the display screen shows a small area of the web page with the rest of the web page being hidden from view. The user can scroll across and down the web page using a navigation tool to view different objects on the web page. The appeal of the pan-and-view format is limited since the user has to scroll the web page to locate and view the objects of interest. This involves trial-and-error and can require the user to traverse areas that are not of interest to reach the object of interest.

Other wireless handsets render web pages in a vertical scrolling box format. In these handsets, the objects on a web page are unanchored from their horizontal position and rendered in a long vertical scrolling box that is the width of the display. The appeal of the vertical scrolling box format is limited by the unnatural appearance to the user. The web page appears broken and the horizontal relationship between objects is lost.

Still other wireless handsets render web pages in a proportionately downscaled format. In these handsets, the web page is shrunk vertically and horizontally to fit within the display while essentially maintaining the aspect ratio of the web page. Moreover, the web browser segments the downsized web page such that when the user selects an object, the downsized web page is replaced with an enlarged view of the selected object. The appeal of this format is limited in that small objects on the downsized web page may be unrecognizable to the user and difficult to select.

SUMMARY OF THE INVENTION

The present invention, in a basic feature, renders objects from a web page on a wireless handset display as selectable panels in perspective views. The rendering of objects from a web page as selectable panels in perspective views allows a web page designed for rendering on a display of a conventional Internet capable device to fit within a much smaller display of a wireless handset while maintaining the relative position, visibility, selectability and natural appearance of the objects to the user.

In one aspect of the invention, a wireless handset comprises a wireless network interface, a user interface and a processor communicatively coupled with a the wireless network interface and the user interface, wherein under control of the processor objects from a web page received on the wireless network interface are rendered on a display of the user interface as selectable panels in perspective views.

In some embodiments, under control of the processor the web page is segmented into two-dimensional panels each comprising an object that are converted into three-dimensional panels and rotated to generate the selectable panels in perspective views.

In some embodiments, the selectable panels are rotated to a first angle of rotation greater than zero and less than ninety degrees about a vertical axis.

In some embodiments, a selection pointer movable by input on an input device of the user interface is rendered on the display, and in response to positioning the selection pointer on one of the selectable panels a first angle of rotation of the selectable panel about a vertical axis is reduced to a second angle of rotation greater than zero degrees, whereby screen size of the selectable panel is increased.

In some embodiments, a selection pointer movable by input on an input device of the user interface is rendered on the display, and in response to positioning the selection pointer on a first one of the selectable panels a first angle of rotation of at least a second one of the selectable panels about a vertical axis is increased to a second angle of rotation less than ninety degrees, whereby screen size of the at least one second selectable panel is reduced.

In some embodiments, a selection pointer movable by input on an input device of the user interface is rendered on the display, and in response to positioning the selection pointer on one of the selectable panels and selecting the selectable panel in a first instance the selectable panel is rendered in a two-dimensional view.

In some embodiments, in response to selecting the selectable panel in a second instance the selectable panel is re-rendered in the perspective view.

In some embodiments, in response to an input on an input device of the user interface the horizontal sequence of the selectable panels is reversed.

In some embodiments, in response to an input on an input device of the user interface the orientation of the selectable panels about a vertical axis is reversed.

In some embodiments, the selectable panels are rotated to different angles of rotation greater than zero and less than ninety degrees about a vertical axis based on the respective horizontal positions of the selectable panels.

In another aspect of the invention, a method for rendering web pages on a wireless handset comprises the steps of receiving on the wireless handset a web page and rendering on a display of the wireless handset objects from the web page as selectable panels in perspective views.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
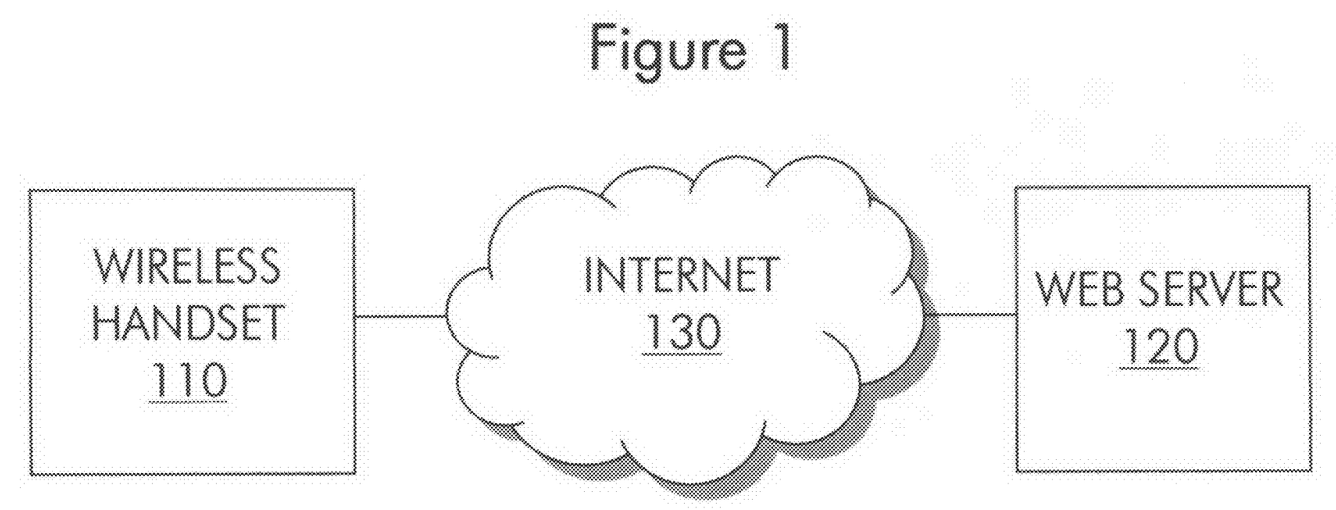
FIG. 1 shows a communication system.

FIG. 1 shows a communication system to include a wireless handset 110 communicatively coupled with a web server 120 via the Internet 130. Handset 110 may be, for example, an Internet capable mobile phone, PDA or GPS navigation device. Handset 110 establishes on-demand wireless communication links to Internet 130 via access devices, such as cellular base stations or Institute of Electrical and Electronics Engineers (IEEE) 802.11 wireless local area network (LAN) access points, for downloading web pages from web server 120 for rendering on handset 110.

Figure 2:
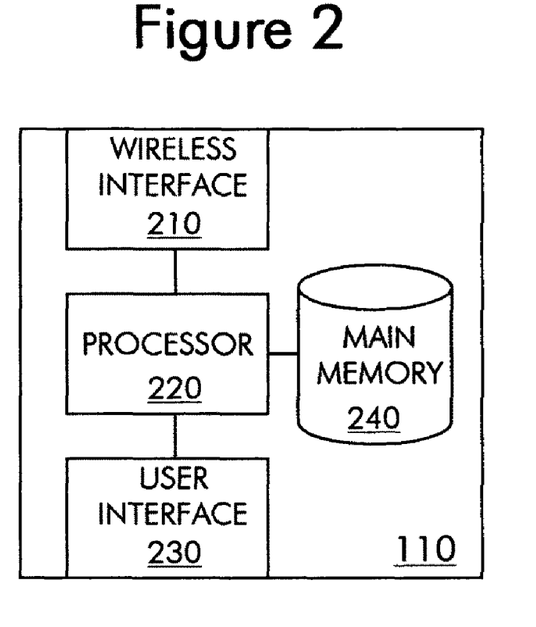
FIG. 2 shows the wireless handset of FIG. 1 in more detail.

FIG. 2 shows handset 110 in more detail to include a wireless network interface 210, a user interface 230 and a main memory 240 communicatively coupled with a processor 220. Wireless interface 210 transmits and receives data over wireless communication links, such as web requests having Uniform Resource Identifiers (URI) of requested web pages and web responses having web pages downloaded in response to web requests. Wireless interface 210 may be, for example, a cellular network interface, a wireless LAN (e.g. Wi-Fi) interface or a wireless wide area network (WAN) (e.g. Wi-Max) interface. User interface 230 receives inputs from a human user of handset 110 via one or more input devices and displays outputs to the user via one or more output devices. Output devices include a display, such as a liquid crystal display (LCD), organic light emitting diode (OLED) display, or a logical display such as a picture-in-picture of a digital television, for displaying web pages. Input devices include, for example, a finger or stylus-operated touch screen, a scroll wheel or ball, a keypad and/or voice command module, for initiating requests for web pages and navigating and manipulating objects in web pages rendered on the display. Processor 220 executes in software operations supported by handset 110, including establishment and tear-down of wireless connections to Internet 130 via wireless interface 210 and requesting and rendering of web pages downloaded from web server 120 via Internet 130 on such connections. Main memory 240 stores software executable by processor 220. Main memory 240 includes one or more random access memories (RAM) and one or more read only memories (ROM).

Figure 3:
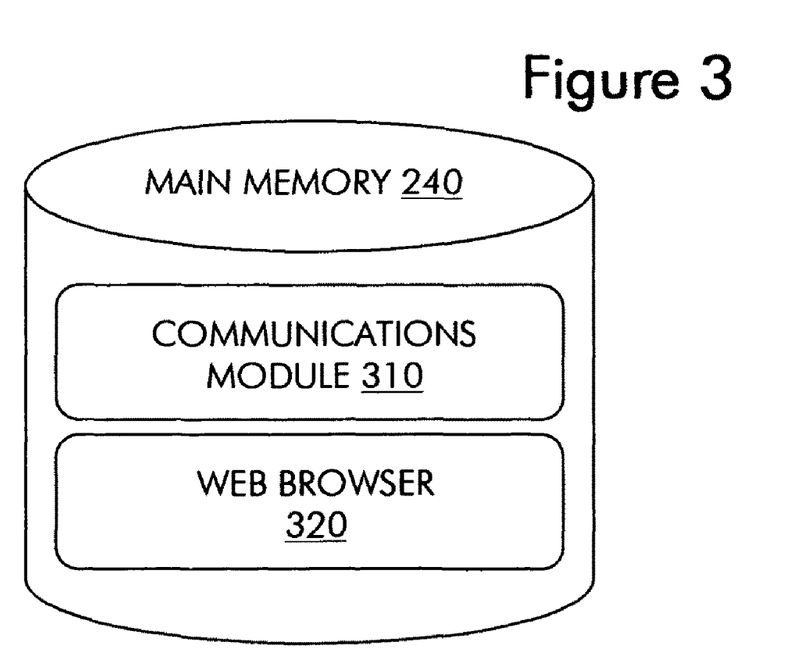
FIG. 3 shows software operative on the wireless handset of FIG. 1.

FIG. 3 shows software operative on handset 110 to include a communications module 310 and a web browser 320. Communications module 310 has instructions executable by processor 220 to establish, manage and tear-down connections to Internet 130 via wireless interface 210. Web browser 320 has instructions executable by processor 220 to request web pages over active connections to Internet 130 and render on a display of user interface 230 web pages downloaded from web server 120 in response to such requests. Importantly, web browser 320 also has instructions executable by processor 220 to render objects in downloaded web pages as selectable panels in perspective views, which involves segmenting downloaded web pages into two-dimensional panels, converting the two-dimensional panels into three-dimensional panels and rotating the three-dimensional panels to generate panels in perspective views. Web browser 320 also has instructions executable by processor 220 to enable a user of handset 110, through inputs on one or more input devices of user interface 230, to manipulate the selectable panels to view content in a manner desired by the user. In some embodiments, web browser 320 is an embedded web browser.

Figure 4:
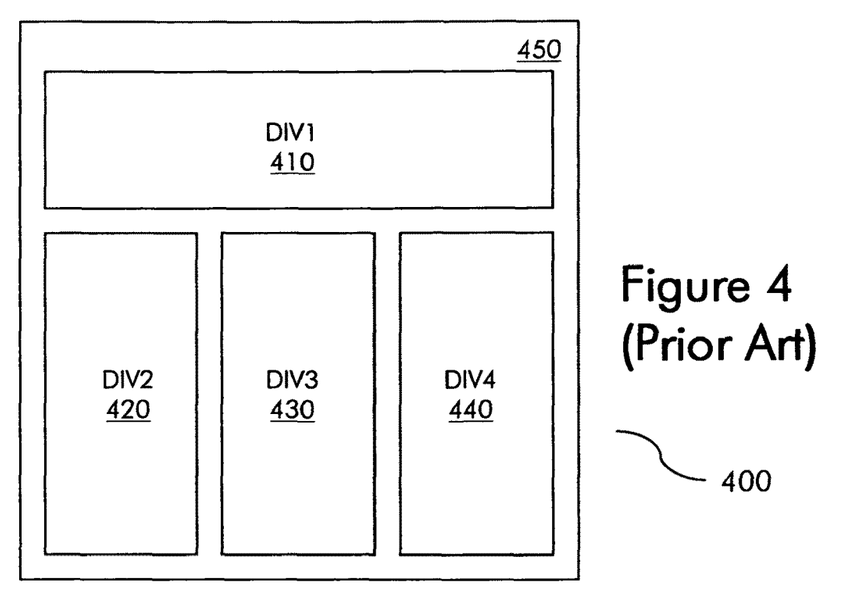
FIG. 4 shows a first rendition of a web page on a conventional Internet capable device in accordance with the prior art.

To underscore differences between prior art and the present invention, FIG. 4 shows a first rendition 400 of a web page on a display 450 of a conventional Internet capable device, such as a desktop PC or workstation. The horizontal width of display 450 may be twelve inches or larger. Objects included in the web page are rendered as non-selectable, two-dimensional objects DIV1 410, DIV2 420, DIV3 430, DIV4 440 whose on-screen positions are delimited by Hypertext Markup Language (HTML) division (DIV) tags or other HTML or Cascading Style Sheet (CSS) commands, such as TABLE, OBJECT or IFRAME. Since the web page is coded for rendering on a display of conventional Internet capable devices, such as display 450, all objects included in the web page fit on-screen and horizontal scrolling is not required.

Figure 5:
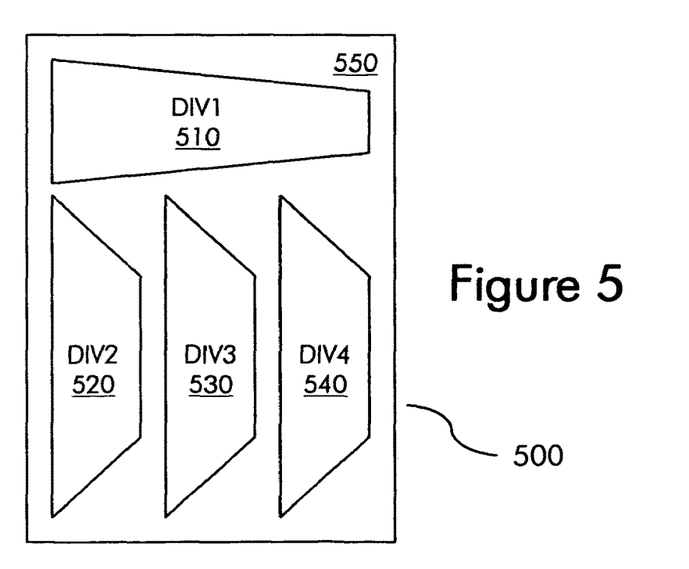
FIG. 5 shows a second rendition of the web page on the wireless handset of FIG. 1 in some embodiments of the invention.

FIG. 5 shows a second rendition 500 of the web page on a display 550 of handset 110 in some embodiments of the invention. The horizontal width of display 550 is much smaller than display 450. In some cases, the horizontal width of display 550 may be three inches or less. In order to fit all objects of the web page on-screen simultaneously in a manner that preserves the natural appearance of the objects, web browser 320 renders the objects on display 550 as selectable panels in perspective views DIV1 510, DIV2 520, DIV3 530, DIV4 540. Web browser 320 creates selectable panels in perspective views DIV1 510, DIV2 520, DIV3 530, DIV4 540 by rotating the objects as shown generally in FIG. 4 counterclockwise to an angle of rotation greater than zero and less than ninety degrees about a vertical axis at the left edge of the objects, while maintaining visual perspective. The object foreshortening that naturally occurs when maintaining visual perspective during such rotation results in a reduction in: (1) the screen width of the objects, and (2) the screen height of the objects in proportion to the perceived distance from the user. In some embodiments, web browser 320 selects an angle of rotation that permits selectable panels 510, 520, 530, 540 to be rendered simultaneously on-screen while substantially maximizing use of the width of display 550. In other embodiments, tradeoffs are made in which a subset of selectable panels are rendered on-screen to ensure adequate visibility of the content of selectable panels, in which case horizontal scrolling is required to view other selectable panels.

Figure 6:
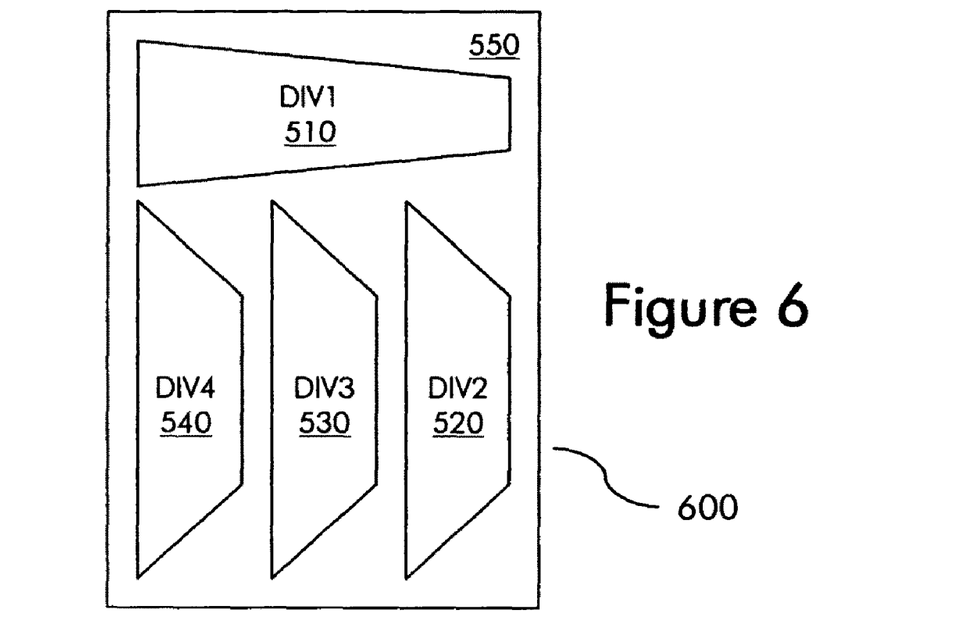
FIG. 6 shows a third rendition of the web page on the wireless handset of FIG. 1 after being shuffled by user input in some embodiments of the invention.

FIG. 6 shows a third rendition 600 of the web page on display 550 after being shuffled by user input in some embodiments of the invention. The user of handset 110 through input on an input device of user interface 230, such as a finger or stylus-operated touch screen, a scroll wheel or ball, a keypad or voice command module, inputs a SHUFFLE command. Web browser 320, under control of processor 220, executes the SHUFFLE command and as a result the horizontal sequence of selectable panels 520, 530, 540 is reversed. Before execution, selectable panel 540 is positioned to the right of selectable panel 530 and selectable panel 530 is positioned to the right of selectable panel 520. After execution, selectable panel 540 is positioned to the left of selectable panel 530 and selectable panel 530 is positioned to the left of selectable panel 520. The position of selectable panel 510 is unchanged.

Figure 7:
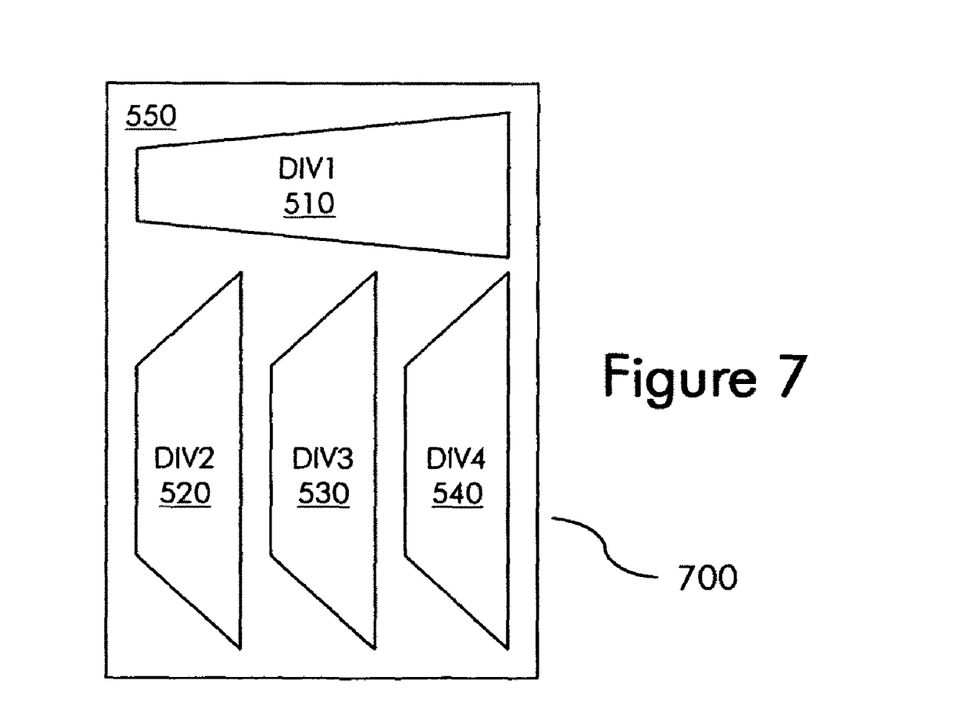
FIG. 7 shows a fourth rendition of the web page on the wireless handset of FIG. 1 after being flipped by user input in some embodiments of the invention.

FIG. 7 shows a fourth rendition 700 of the web page on display 550 after being flipped by user input in some embodiments of the invention. The user of handset 110 through input on an input device of user interface 230, such as a finger or stylus-operated touch screen, a scroll wheel or ball, a keypad or a voice command module, inputs a FLIP command. Web browser 320, under control of processor 220, executes the FLIP command and as a result the orientation of selectable panels 510, 520, 530, 540 about a vertical axis is reversed. Before execution, the screen height of selectable panels 510, 520, 530, 540 is at a minimum at the right edge and a maximum at the left edge. After execution, the screen height of selectable panels 510, 520, 530, 540 is at a maximum at the right edge and a minimum at the left edge.

Figure 8:
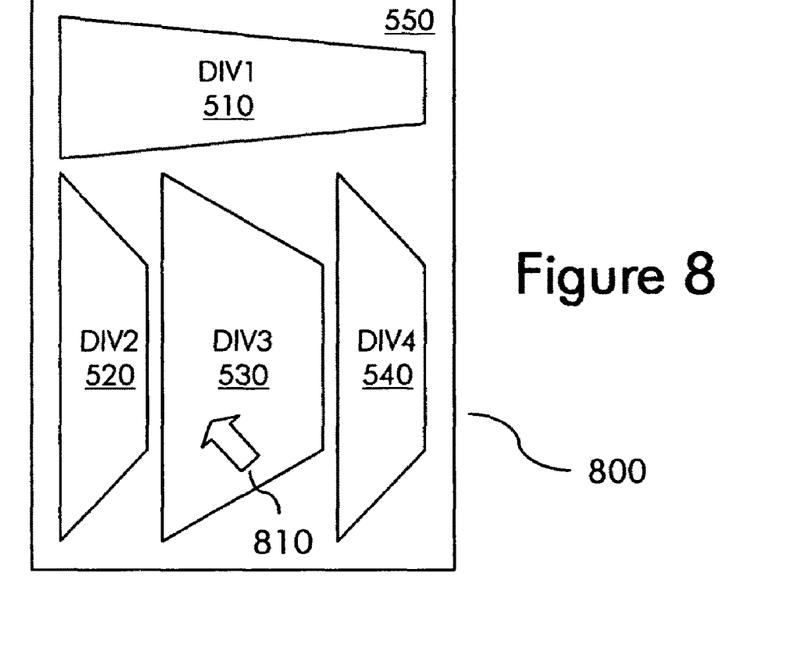
FIG. 8 shows a fifth rendition of the web page on the wireless handset of FIG. 1 while a selection pointer hovers over a selectable panel in some embodiments of the invention.

FIG. 8 shows a fifth rendition 800 of the web page on display 550 while a selection pointer 810 hovers over selectable panel 530 in response to user input in some embodiments of the invention. The user of handset 110 through input on an input device of user interface 230, such as a finger or stylus-operated touch screen, a scroll wheel or ball, a keypad or a voice command module, moves selection pointer 810 over selectable panel 530. While selection pointer 810 is positioned over selectable panel 530, web browser 320 reduces the angle of rotation of selectable panel 530 about a vertical axis to a lower angle of rotation greater than zero degrees, whereby the screen size of selectable panel 530 is increased. This hovering action gives the user of handset 110 greater visibility of the contents of selectable panel 530 and informs the user that selectable panel 530 is ready for selection. At the same time, while selection pointer 810 is positioned over selectable panel 530 web browser 320 increases the angle of rotation of selectable panels 520, 540 about a vertical axis to a higher angle of rotation less than ninety degrees, whereby the screen size of selectable panels 520, 540 is reduced. This accents for the user that selectable panel 530 is the panel that is ready for selection and that selectable panels 520, 540 are not ready for selection.

Figure 9:
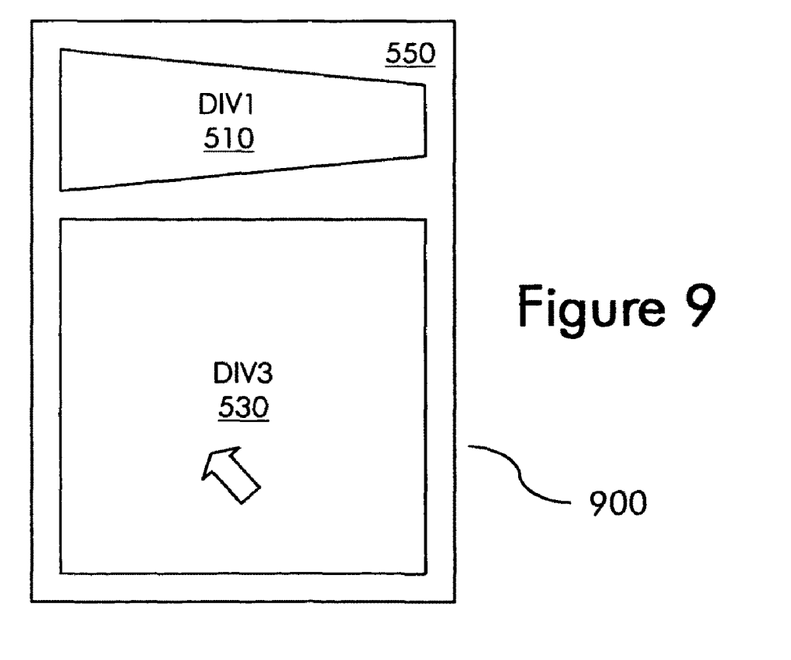
FIG. 9 shows a sixth rendition of the web page on the wireless handset of FIG. 1 after a selectable panel has been selected by user input in some embodiments of the invention.

FIG. 9 shows a sixth rendition 900 of the web page on display 550 after selectable panel 530 has been selected in response to user input in some embodiments of the invention. The user of handset 110 through input on an input device of user interface 230, such as a finger or stylus-operated touch screen, a scroll wheel or ball, a keypad or a voice command module, selects selectable panel 530. This selection may be made, for example, by a touch, tap or click on an input device while selection pointer 810 hovers over selectable panel 530. In response to the selection, web browser 320 eliminates perspective from selectable panel 530, which results in selectable panel 530 being displayed in a two-dimensional view. The elimination of perspective results in an increase in: (1) the screen width of panel 530 and (2) the screen height of panel 530 at positions that were perceived as at a distance while panel 530 was rendered in a perspective view. The selection of selectable panel 530 gives the user of handset 110 added visibility of the contents of selectable panel 530. In some embodiments, web browser 320 may enlarge selectable panel 530 to full screen height to provide added resolution.

Figure 10:
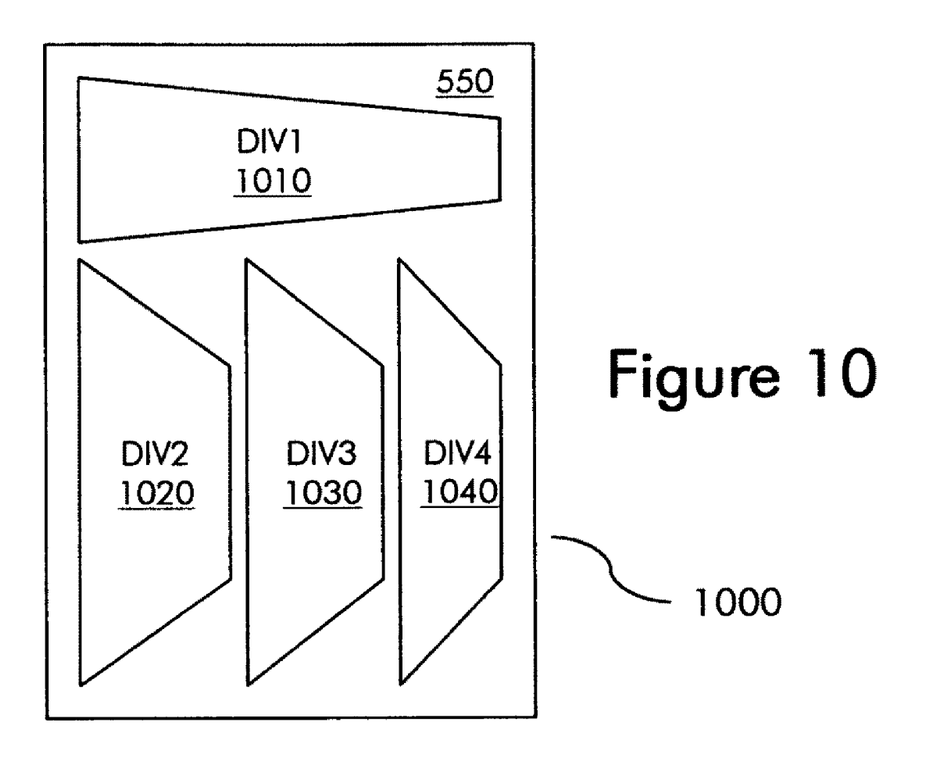
FIG. 10 shows a rendition of the web page on the wireless handset of FIG. 1 in other embodiments of the invention.

FIG. 10 shows a rendition 1000 of the web page on display 550 in other embodiments of the invention. As in the previous embodiments, web browser 320 in these other embodiments renders the objects included in the web page on display 550 as selectable panels in perspective view DIV1 1010, DIV2 1020, DIV3 1030, DIV4 1040. However, in these other embodiments, the angle of rotation counterclockwise about a vertical axis varies with the relative horizontal position of selectable panels 1010, 1020, 1030, 1040. Accordingly, leftmost selectable panel 1010 has a smaller angle of rotation than middle selectable panel 1020, and middle selectable panel 1020 has a smaller angle of rotation than rightmost selectable panel 1030.

Figure 11:
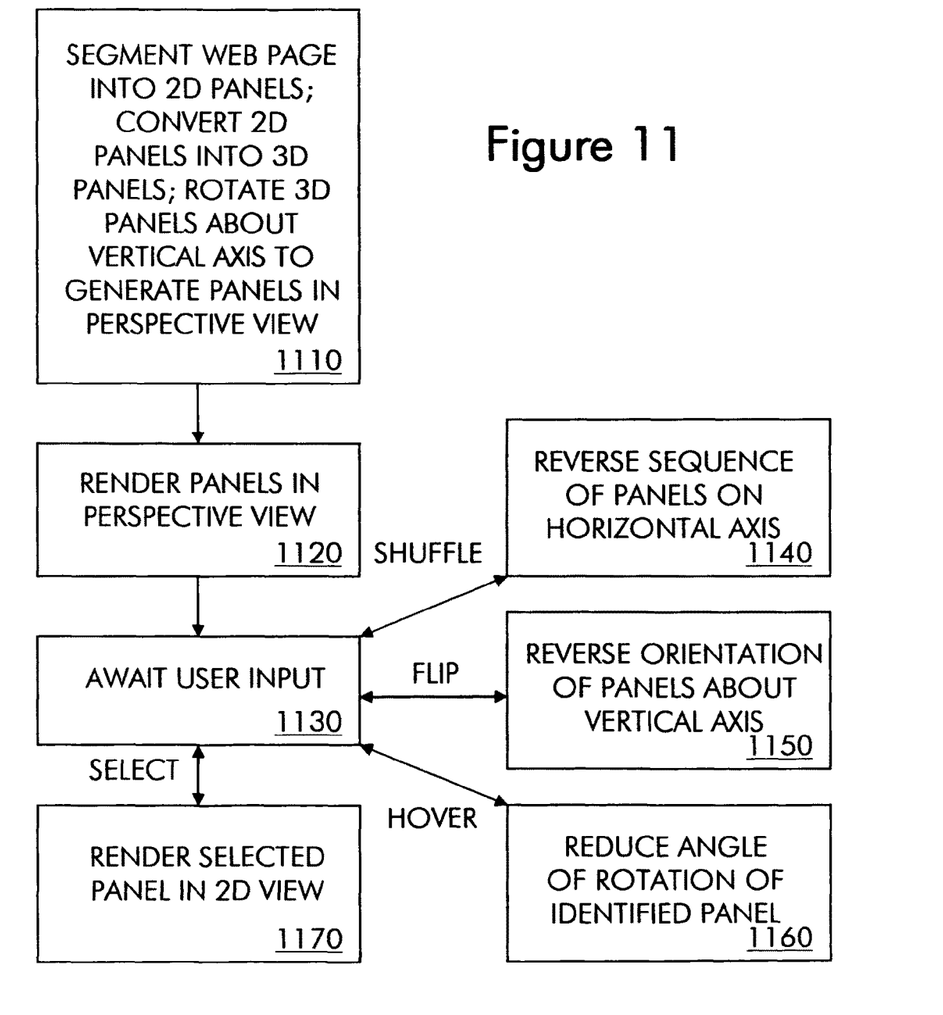
FIG. 11 shows a method for rendering web pages on a wireless handset in some embodiments of the invention.

FIG. 11 shows a method for rendering web pages on handset 110 in some embodiments of the invention. Prior to execution of the method steps shown in FIG. 11, communications module 310 establishes a wireless communication link to Internet 130 via wireless interface 210 and web browser 320 services a web request initiated by a user of handset 110 to retrieve a corresponding web page from web server 120.

Then, in accordance with the method steps shown in FIG. 11, web browser 320 segments the downloaded web page into two-dimensional panels each having at least one object included in the web page, converts the two-dimensional panels into three-dimensional panels and rotates the three-dimensional panels about a vertical axis to create panels in perspective views (1110). The two-dimensional panels are created from rectangular objects of the web page whose boundaries are identified by web browser 320 by reference to DIV tags or other HTML or CSS commands, such as TABLE, OBJECT and IFRAME associated with the web page. In some embodiments, rectangular objects at different vertical positions of the web page that are in close horizontal alignment may be combined into a single panel. Three-dimensional panels are created from the two-dimensional panels using conventional 2D/3D mapping techniques, such as using linear algebra and matrix multiplication or skewing and scaling. The angle of rotation is chosen, in some embodiments, to permit all of the three-dimensional panels to be rendered simultaneously on-screen while substantially maximizing use of the width of display 550.

Next, web browser 320 renders the three-dimensional panels on display 550 as selectable panels in perspective views (1120) and awaits user action (1130). The horizontal sequence of the panels as rendered on display 550 conforms to the horizontal sequence for the objects defined by the web page. If the user inputs a SHUFFLE command, web browser 320 executes the command and the horizontal sequence of the selectable panels is reversed (1140), after which web browser 320 awaits further user action (1130). If the user inputs a FLIP command, web browser 320 executes the command and the orientation of the selectable panels about a vertical axis is reversed (1150), after which web browser 320 awaits further user action (1130). If the user positions a selection pointer over a selectable panel (i.e. a HOVER action), web browser 320 reduces the angle of rotation of the selectable panel about the vertical axis to a lower angle of rotation greater than zero degrees, whereby the screen size of the selectable panel is increased (1160), after which web browser 320 awaits further user action (1130). Finally, if the user selects a selection panel through a touch, tap or click on an input device while a selection pointer is positioned over the selectable panel (i.e. a SELECT action), web browser 320 eliminates perspective and renders the selectable panel on display 550 in a two-dimensional view (1170), after which web browser 320 awaits further user action (1130). It bears noting that issuing a second touch, tap or click while a selection pointer is positioned over the selectable panel returns perspective to the selectable panel. It also bears noting that positioning a selection pointer over a selectable panel, without selecting the selectable panel via touch, tap or click, while the selectable panel is already in a two-dimensional view has no visible effect on the selectable panel.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A wireless handset, comprising:
   a wireless network interface;
   a user interface; and
   a processor communicatively coupled with the wireless network interface and the user interface, wherein under control of the processor objects from a web page received on the wireless network interface are rendered on a display of the user interface as selectable panels in perspective views, wherein a selection pointer movable by input on an input device of the user interface is rendered on the display, and in response to positioning the selection pointer on one of the selectable panels a first angle of rotation of the selectable panel about a vertical axis is reduced to a second angle of rotation greater than zero degrees, whereby screen size of the selectable panel is increased.

2. The handset of claim 1, wherein under control of the processor the web page is segmented into two-dimensional panels each comprising an object that are converted into three-dimensional panels and rotated to generate the selectable panels in perspective views.

3. The handset of claim 1, wherein in response to selecting the selectable panel in a first instance the selectable panel is rendered in a two-dimensional view.

4. The handset of claim 3, wherein in response to selecting the selectable panel in a second instance the selectable panel is re-rendered in the perspective view.

5. The handset of claim 1, wherein in response to a further input on the input device the horizontal sequence of the selectable panels is reversed.

6. The handset of claim 1, wherein in response to a further input on the input device the orientation of the selectable panels about a vertical axis is reversed.

7. The handset of claim 1, wherein the selectable panels are rotated to different angles of rotation greater than zero and less than ninety degrees about a vertical axis based on the respective horizontal positions of the selectable panels.

8. A wireless handset, comprising:
   a wireless network interface;
   a user interface; and
   a processor communicatively coupled with the wireless network interface and the user interface, wherein under control of the processor objects from a web page received on the wireless network interface are rendered on a display of the user interface as selectable panels in perspective views, wherein a selection pointer movable by input on an input device of the user interface is rendered on the display, and in response to positioning the selection pointer on a first one of the selectable panels a first angle of rotation of at least a second one of the selectable panels about a vertical axis is increased to a second angle of rotation less than ninety degrees, whereby screen size of the at least one second selectable panel is reduced.

9. A method for rendering web pages on a wireless handset, comprising the steps of:
   receiving on the wireless handset a web page;
   rendering on a display of the wireless handset objects from the web page as selectable panels in perspective views;
   positioning a selection pointer on one of the selectable panels; and in response to the positioning step,
   reducing a first angle of rotation of the selectable panel about a vertical axis to a second angle of rotation greater than zero degrees, whereby screen size of the selectable panel is increased.

10. The method of claim 9, further comprising the steps of:
    segmenting the web page into two-dimensional panels each having an object;
    converting the two-dimensional panels into three-dimensional panels; and
    rotating the three-dimensional panels to generate the selectable panels in perspective views.

11. The method of claim 9, further comprising the steps of:
    selecting the selectable panel in a first instance; and in response to the first selecting step,
    rendering the selectable panel in a two-dimensional view.

12. The method claim 11, further comprising the steps of:
    selecting the selectable panel in a second instance; and in response to the second selecting step,
    re-rendering the selectable panel in a perspective view.

13. The method of claim 9, further comprising the step of reversing the horizontal sequence of the selectable panels in response to a user input.

14. The method of claim 9, further comprising the step of reversing the orientation of the selectable panels about a vertical axis in response to a user input.

15. The method of claim 9, wherein the selectable panels are rotated to different angles of rotation greater than zero and less than ninety degrees about a vertical axis based on the respective horizontal positions of the selectable panels.

16. A method for rendering web pages on a wireless handset, comprising the steps of:
    receiving on the wireless handset a web page;
    rendering on a display of the wireless handset objects from the web page as selectable panels in perspective views;
    positioning a selection pointer on a first one of the selectable panels; and in response to the positioning step,
    increasing a first angle of rotation of at least a second one of the selectable panels about a vertical axis to a second angle of rotation less than ninety degrees, whereby screen size of the at least one second selectable panel is reduced.

17. A wireless handset, comprising:
    a wireless network interface;
    a user interface; and
    a processor communicatively coupled with the wireless network interface and the user interface, wherein under control of the processor objects from a web page received on the wireless network interface are rendered on a display of the user interface as selectable panels in perspective views, wherein one of the selectable panels is hovered over in response to input on an input device of the user interface, and in response to being hovered over a first angle of rotation of the selectable panel about a vertical axis is reduced to a second angle of rotation greater than zero degrees, whereby screen size of the selectable panel is increased.

18. A wireless handset, comprising:
    a wireless network interface;
    a user interface; and
    a processor communicatively coupled with the wireless network interface and the user interface, wherein under control of the processor objects from a web page received on the wireless network interface are rendered on a display of the user interface as selectable panels in perspective views, wherein a first one of the selectable panels is hovered over in response to input on an input device of the user interface, and in response to the first selectable panel being hovered over a first angle of rotation of at least a second one of the selectable panels about a vertical axis is increased to a second angle of rotation less than ninety degrees, whereby screen size of the at least one second selectable panel is reduced.

* * * * *